United States Patent
Maierholzner

(10) Patent No.: US 7,077,468 B2
(45) Date of Patent: Jul. 18, 2006

(54) COVER SUPPORTED ON A SUPPORT

(75) Inventor: Thomas Maierholzner, Vilsbiburg (DE)

(73) Assignee: Seeber AG & Co. KG, Mannheim (DE)

( * ) Notice: Subject to any disclaimer, the term of this patent is extended or adjusted under 35 U.S.C. 154(b) by 311 days.

(21) Appl. No.: 10/668,691

(22) Filed: Sep. 23, 2003

(65) Prior Publication Data

US 2004/0108740 A1 Jun. 10, 2004

(30) Foreign Application Priority Data

Sep. 23, 2002 (DE) .......................... 202 14 711 U

(51) Int. Cl.
*B60N 2/46* (2006.01)
(52) U.S. Cl. ............................ 297/188.19; 297/411.35; 296/37.8; 220/348
(58) Field of Classification Search ........... 297/188.14, 297/188.19, 411.21, 411.35; 296/37.8, 97.11; 224/275, 539; 220/345.3, 345.4, 348, 351
See application file for complete search history.

(56) References Cited

U.S. PATENT DOCUMENTS

| 4,712,845 | A | * | 12/1987 | Nicol | ........................ 296/37.9 |
| 5,845,965 | A | * | 12/1998 | Heath et al. | ........... 297/188.19 |
| 5,884,799 | A | * | 3/1999 | Korber et al. | ............... 220/348 |
| 6,045,173 | A | * | 4/2000 | Tiesler et al. | ............... 296/37.8 |
| 6,074,012 | A | * | 6/2000 | Wu | ........................ 297/411.35 |
| 6,341,821 | B1 | | 1/2002 | Rousseau | |
| 6,419,314 | B1 | * | 7/2002 | Scheerhorn | ................. 296/37.8 |
| 6,547,299 | B1 | * | 4/2003 | Atanasiu et al. | ........... 296/37.8 |
| 6,669,258 | B1 | * | 12/2003 | Kato | ........................... 296/37.8 |
| 6,719,367 | B1 | * | 4/2004 | Mic et al. | .............. 297/411.21 |
| 2002/0089217 | A1 | | 7/2002 | Scheerhorn | |

FOREIGN PATENT DOCUMENTS

| DE | 35 29 957 | 3/1987 |
| DE | 199 18 608 | 10/1999 |
| DE | 196 46 645 C2 | 11/1999 |
| DE | 198 12 432 C2 | 4/2000 |
| DE | 201 00 902 U1 | 7/2001 |
| EP | 0 854 064 A2 | 7/1998 |
| EP | 1 348 593 | 1/2003 |

* cited by examiner

*Primary Examiner*—Peter R. Brown
(74) *Attorney, Agent, or Firm*—Andrew Wilford

(57) ABSTRACT

A cover is supported on a support, particularly a cover that is arranged pivotably on a support. The cover is characterised by a support member and a covering, that may be moved towards one another in a first spatial direction and are positively engaged with one another in the other spatial directions, wherein the support member and the covering may be arrested with respect to one another in at least one shifted position by a force that is exerted in the direction of one of the other two spatial directions.

11 Claims, 4 Drawing Sheets

COVER SUPPORTED ON A SUPPORT

FIELD OF THE INVENTION

The invention relates to a cover supported on a support, particularly a cover that is arranged pivotably on a support.

BACKGROUND OF THE INVENTION

Armrests that may be adjusted, for instance in terms of height, with reference to a support device are known in the related art. An armrest of such kind is known from German patent document 198 12 432 filed 21 Mar. 1998 by N. Lotz et al. The armrest is adjusted with a lever arm. In addition, the armrest is arranged pivotably.

OBJECT OF THE INVENTION

It is an object of the present invention to provide an improved cover that is usable in a wide range of situations.

SUMMARY OF THE INVENTION

According to the invention a cover of the kind indicated in the introduction, this task is solved with a support member and covering that may be moved towards one another in a first spatial direction and are positively engaged with one another in the other spatial directions, wherein the support member and the covering may be arrested with respect to one another in at least one shifted position by a force that is exerted in the direction of one of the other two spatial directions.

The cover according to the invention is usable particularly as an armrest in a motor vehicle, for example as an armrest on the middle console. In this case, the armrest is preferably arranged movably in the direction of travel of the vehicle. Additionally, the cover, i.e. in this case the armrest, may also be pivoted about a horizontal axis perpendicular to the direction of travel. The armrest may be moved until a force from above besides the weight of the covering of the cover is exerted on the cover. If an additional force is applied, for example by an arm that is rested on the armrest, the covering is locked with respect to the support member. This prevents the arm that is thus resting on the armrest from being moved in an undesired way.

A cover on which the support member and the covering may be locked with respect to one another in any shifted position is particularly suitable. In this way, particularly when the cover is used as an armrest, all positions are then possible for resting the arm.

One suitable embodiment of the cover provides that in an unloaded condition the support member and the cover are separated from one another by an elastic element that is connected to the support member or the covering and in the loaded condition are pressed against one another by compression of the elastic element. The elastic element thus assures that sliding friction or rolling friction occurs only in the area of the elastic element. If the elastic element includes a roller, a wheel or a ball bearing in the contact area between the support member and the covering, rolling friction is present.

The elastic element is advantageously constructed with pressure springs that are attached to a moving carrier plate located on the support member. The pressure springs have a spring force that is greater than the weight of the covering.

The pressure springs are preferably located in blind holes in the moving carrier plate.

In order to ensure a minimum of friction between the covering and the support member, the side of the pressure springs that cooperates with the covering is covered with an individual cap.

In one advantageous embodiment, the cover is equipped with a strip, particularly a rubber strip, that exerts strong static friction on an adjacent surface. The strip is attached either to the support member, particularly to the moving carrier plate, or to the covering, or to the support member and the covering.

It is also advantageous if the strip includes a toothed or ridged arrangement. Especially if two strips are applied to the support member and/or the covering, and each includes a toothed or ridged arrangement, or if the adjacent surface includes a toothed or ridged arrangement, a strong retention force is exerted when the covering is pressed against the support member, for instance by resting an arm or another object thereon.

A brake, particularly a silicone brake, may be fitted advantageously between the support member and the covering to increase the delay in sliding movements of the cover.

In one configuration of the invention the brake is secured to the moving carrier plate and is equipped with a crown gear that engages with a lengthwise tooth arrangement arranged in a groove in the covering.

BRIEF DESCRIPTION OF THE DRAWING

The above and other objects, features, and advantages will become more readily apparent from the following description, reference being made to the accompanying drawing in which.

SPECIFIC DESCRIPTION

Figure 4:
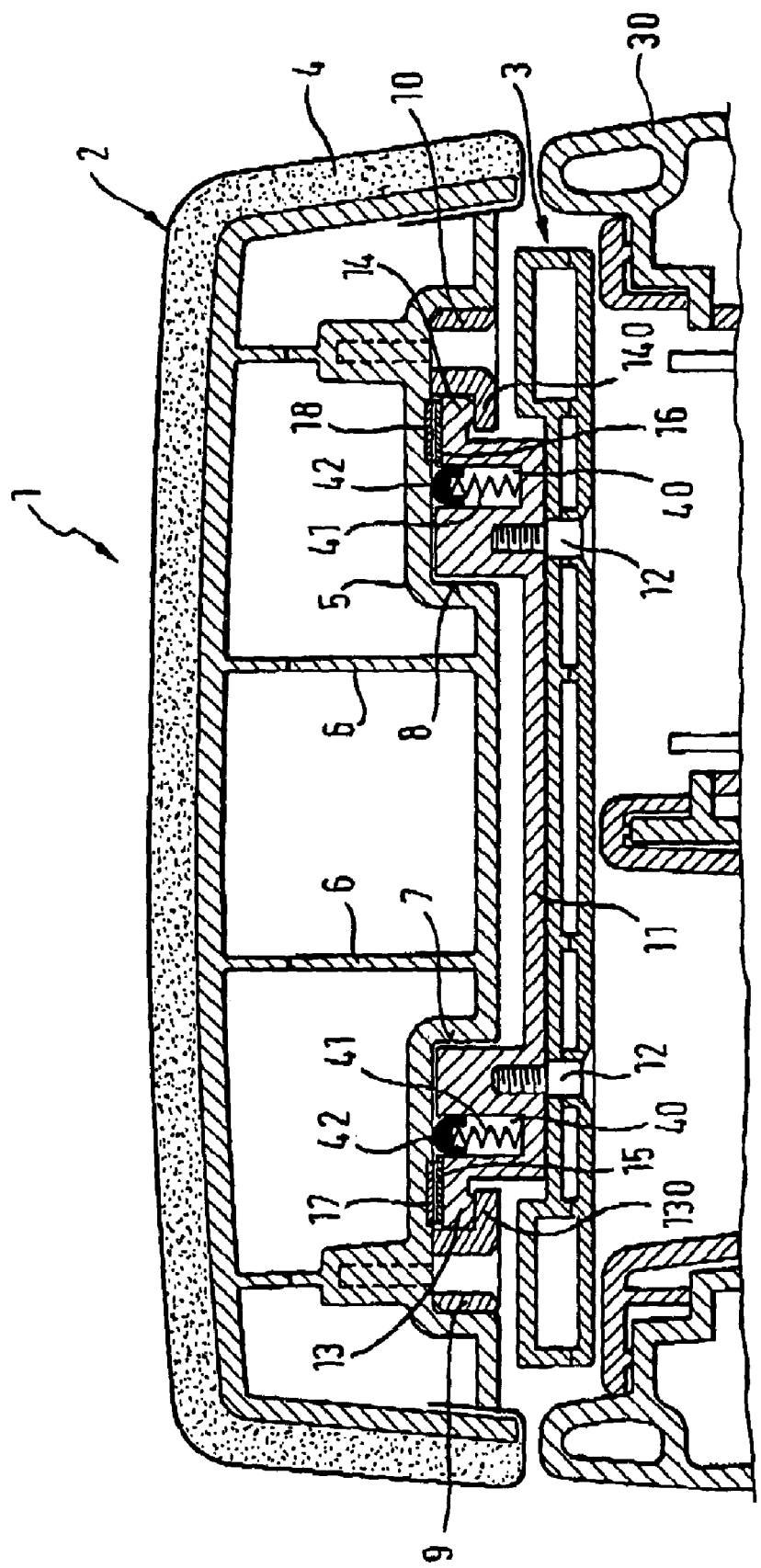
FIG. 4 is a cross-section along line IV—IV in FIG. 2.

An armrest for a middle console of a motor vehicle includes a cover 1 (FIG. 4). Cover 1 includes a covering 2 and a support member 3. Covering 2 includes an outer part 4 and an inner part 5, the upper and lateral sides of which are covered by outer part 4. A space between outer part 4 and inner part 5 accommodates reinforcing walls 6 or ribs.

Figure 1:
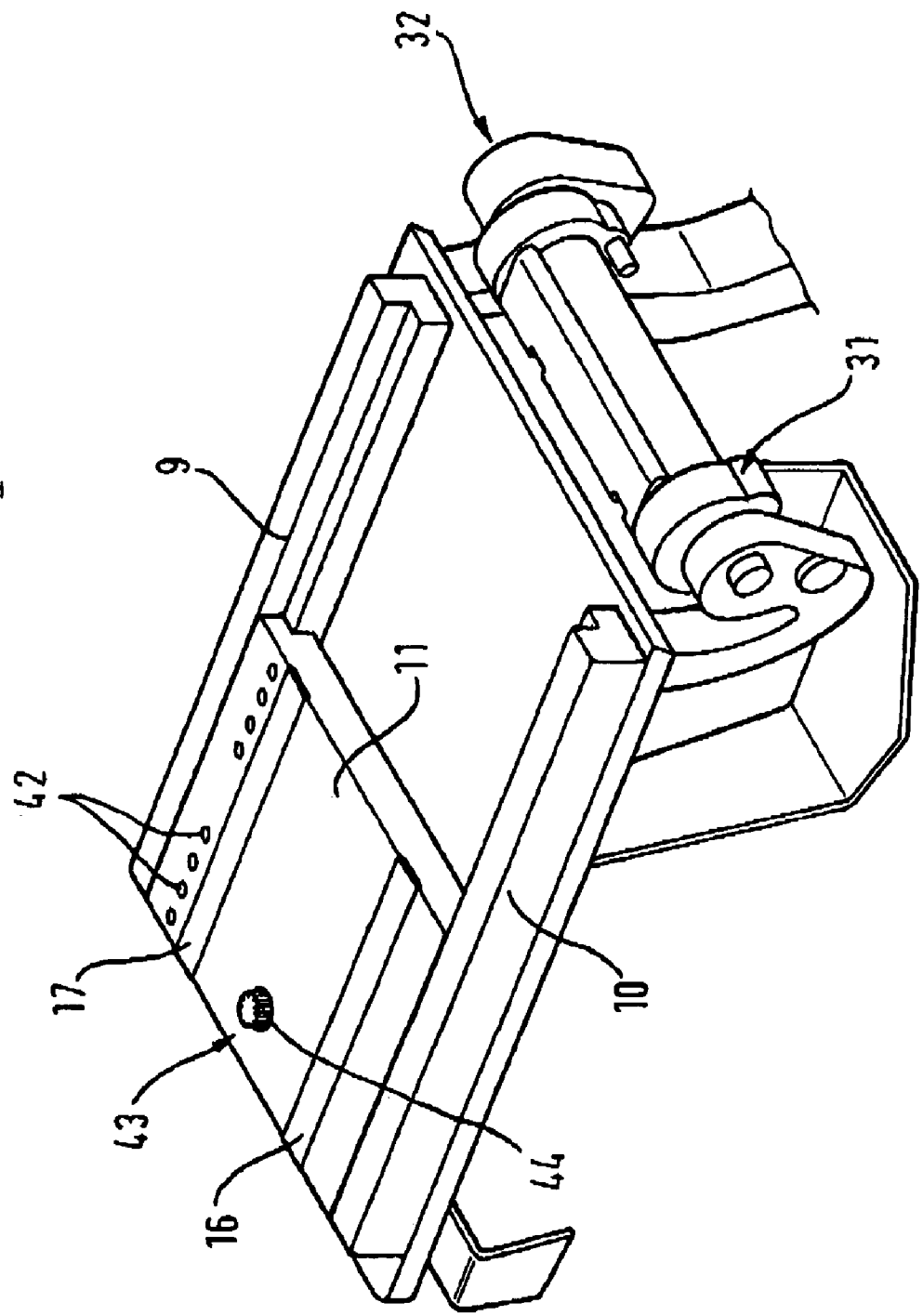
FIG. 1 is a perspective view of a support and a support member articulated therewith with via a hinge for a cover with a moving carrier plate.
Figure 2:
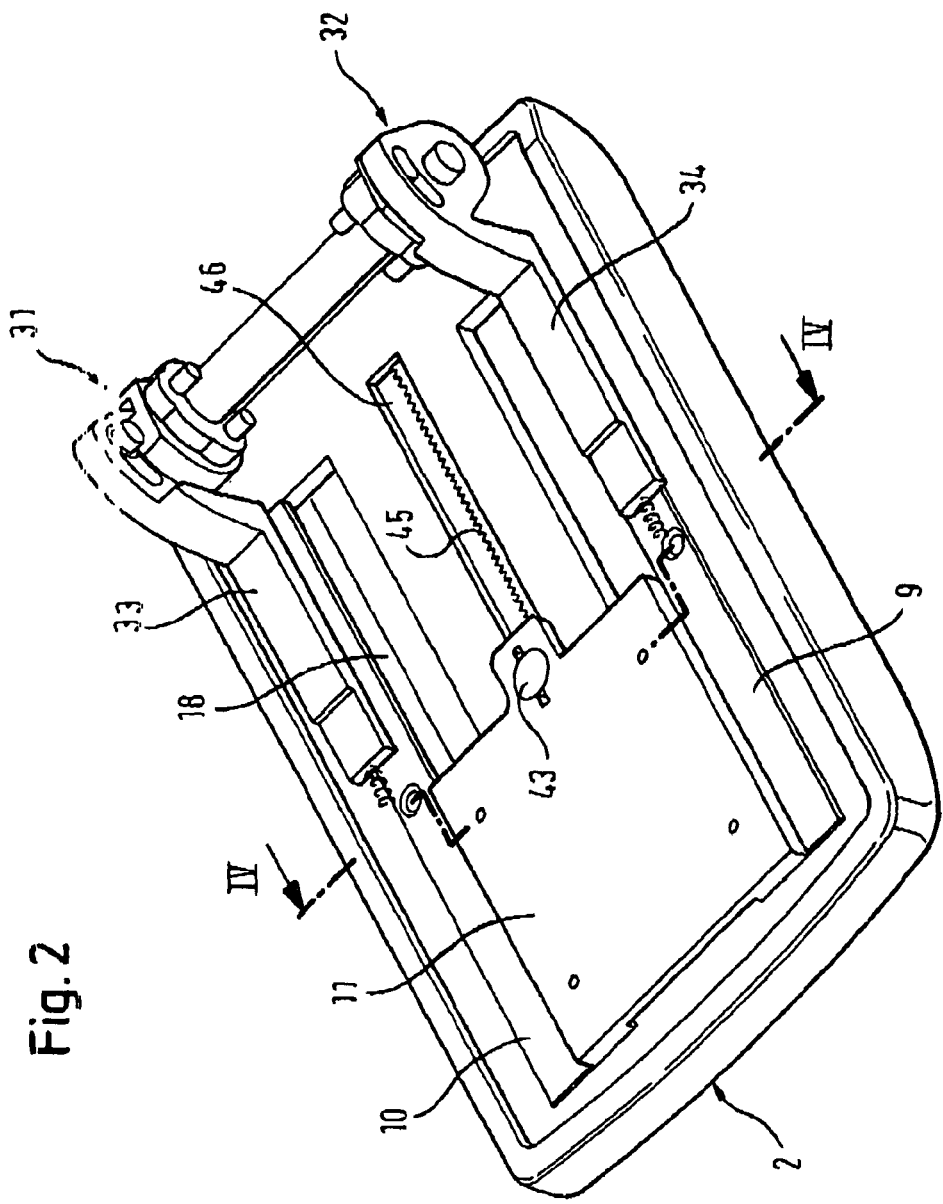
FIG. 2 is a perspective view of the cover covering together with the moving carrier plate.
Figure 3:
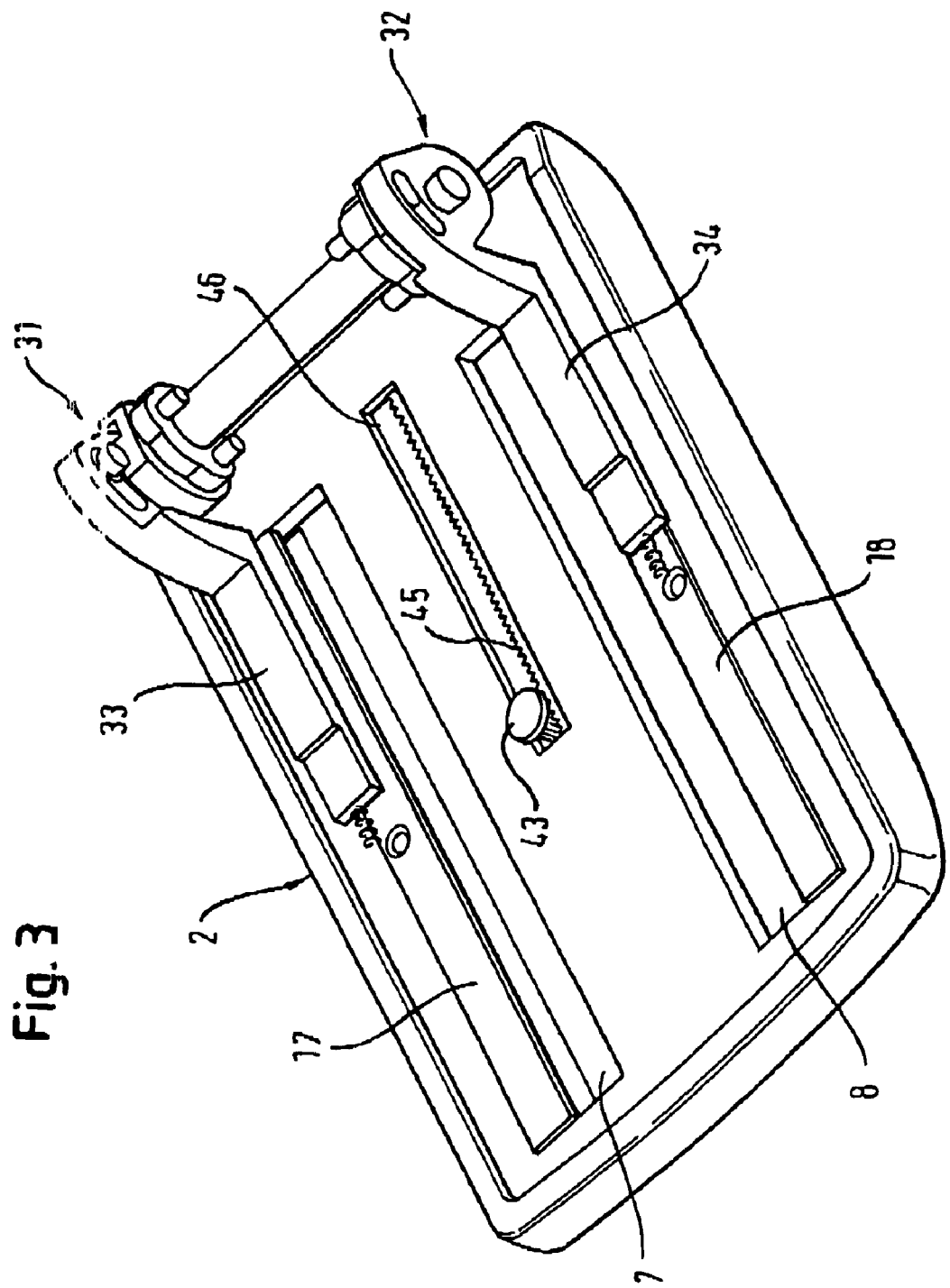
FIG. 3 is a perspective view of the covering without the moving carrier plate.

Support member 3 rests on a support 30. It is pivotable with respect to support 30 by means of hinges 31, 32 (FIG. 1). Hinge clips 33, 34 are attached to hinges 31, 32 respectively (FIGS. 2, 3), and are in turn permanently secured to support member 3.

Inner part 5 includes two channels 7, 8, that extend longitudinally. Channels 7, 8 each accommodate a guide lip 9, 10, which are screwed or stuck into channels 7, 8. Guide lips 9, 10 both have an L-shaped cross-section with legs 130 and 140 point inwards.

Support member 3 supports a moving carrier plate 11 that is securely attached to support member 3 with screws 12.

Moving carrier plate 11 includes projections 13, 14 that protrude into the area between guide lips 9, 10 and the bottom surface of channels 7, 8.

Narrow strips of a material with high static friction are attached to the side of moving carrier plate 11 facing channels 7, 8.

In the same way, strips 17, 18 are also attached to the bottom surface of both channels 7, 8, and these cooperate adhesively with strips 15, 16, when covering 2 is pressed against support member 3. Strips 15, 16; 17, 18 are also furnished with a toothed or ridged arrangement to enhance the adhesion between covering 2 and the support member.

Moving carrier plate 11 is provided with boreholes 40 on the side thereof facing inner part 5 in the area of channels 7, 8 to accommodate elastic elements that press covering 2 upwards at localised points. The elastic elements are preferably helical pressure springs 41, the side of each of which that faces covering 2 is enclosed by a hemispherical or cylindrical cap 42. Cap 42 reduces the friction that is generated when covering 2 slides over moving carrier plate 11. It also protects pressure springs 41 or the surface in channels 7, 8 from damage.

In order to enable covering 2 and support member 3 to be adjusted only slowly with respect to one another, a brake 43, preferably a silicone brake, is attached therebetween, and is retained in moving carrier plate 11. Brake 43 includes a crown gear 44 that cooperates with a lengthwise tooth arrangement 45. Lengthwise tooth arrangement 45 is seated in a channel 46 in covering 2.

The invention thus provides a cover 1 including a covering 2 and a support member 3 that are movable towards one another in a first spatial direction and are positively are positively engaged with one another in the other spatial directions, wherein support member 3 and covering 2 may be locked in at least one shifted position with respect to each other by a force exerted in the direction of one of the two other spatial directions.

I claim:

1. An armrest comprising:
    an elongated support member pivotable at one end thereof by a hinge with respect to a support;
    an armrest cover member slidable longitudinally on said support member, said support member having a surface turned toward said armrest cover member and said armrest cover member having a surface juxtaposed with the surface of said support member;
    at least one elastic element on one of said members bearing on the other of said member to separate said surfaces from one another and allow longitudinal relative displacement of said members, said armrest cover member being loadable by an arm of a user to compress said elastic element and press said surfaces against each other, thereby locking said armrest cover member relative to said support member in any relative displacement positions of said members permitted by said longitudinal relative displacement.

2. The armrest defined in claim 1 wherein the elastic element is provided with a pressure spring mounted on a carrier plate located on said support member.

3. The armrest defined in claim 2 wherein said carrier plate has a multiplicity of holes in an array extending in a longitudinal direction and accommodating respective pressure springs each forming an elastic element bearing on said armrest cover member.

4. The armrest defined in claim 3 wherein each of said springs has a cap bearing upon said armrest cover member.

5. The armrest defined in claim 4 wherein at least one of said surfaces has a strip exerting strong static friction on the other of said surfaces to lock said surfaces together upon the application of a load to said armrest cover member.

6. The armrest defined in claim 5 wherein said strip has a toothed or ridged configuration.

7. The armrest defined in claim 6 wherein said other surface is provided with a strip with strong static friction juxtaposed with the first mentioned strip.

8. The armrest defined in claim 7 wherein said other strip has a toothed or ridged arrangement engaging the toothed or ridged arrangement of the first mentioned strip.

9. The armrest defined in claim 1 wherein a brake is provided between said support member and said armrest cover member to slow sliding movement of said armrest cover member.

10. The armrest defined in claim 9 wherein said brake is a silicone brake.

11. The armrest defined in claim 10 wherein said brake is secured to a carrier plate on said support member and has a crown gear engaging a longitudinally extending array of teeth in a channel formed on said cover member.

* * * * *